(12) United States Patent
Sauvage et al.

(10) Patent No.: US 12,139,626 B2
(45) Date of Patent: Nov. 12, 2024

(54) IRREVERSIBLY ERASABLE INK COMPOSITION HAVING A DISCOLORATION AGENT

(71) Applicant: Société BIC, Clichy (FR)

(72) Inventors: Aurore Sauvage, Gy-les-Nonains (FR); Guillaume Caffier, Wegscheid (FR)

(73) Assignee: Société BIC, Clichy (FR)

( * ) Notice: Subject to any disclaimer, the term of this patent is extended or adjusted under 35 U.S.C. 154(b) by 306 days.

(21) Appl. No.: 17/130,528

(22) Filed: Dec. 22, 2020

(65) Prior Publication Data

US 2021/0230440 A1    Jul. 29, 2021

(30) Foreign Application Priority Data

Jan. 28, 2020 (EP) ..................................... 20000039
Feb. 14, 2020 (EP) ..................................... 20315020

(51) Int. Cl.
| | |
|---|---|
| *C09D 11/50* | (2014.01) |
| *C08K 5/17* | (2006.01) |
| *C08L 101/00* | (2006.01) |
| *C09D 11/17* | (2014.01) |
| *C09D 11/18* | (2006.01) |

(52) U.S. Cl.
CPC ............... *C09D 11/50* (2013.01); *C08K 5/17* (2013.01); *C08L 101/00* (2013.01); *C09D 11/17* (2013.01); *C09D 11/18* (2013.01); *C08L 2207/53* (2013.01)

(58) Field of Classification Search
CPC ......... C09D 11/50; C09D 11/17; C09D 11/18; C09D 11/10; C09D 11/106; C08K 5/17; C08L 101/00; C08L 2207/53
See application file for complete search history.

(56) References Cited

U.S. PATENT DOCUMENTS

| 8,182,596 B2 * | 5/2012 | Kurihara | C09D 11/50 106/31.64 |
| 2003/0121448 A1 * | 7/2003 | Chen | B41M 5/305 106/31.18 |
| 2010/0275813 A1 | 11/2010 | Kurihara et al. | |
| 2012/0259088 A1 * | 10/2012 | Iyer | C08G 73/00 528/343 |
| 2013/0172181 A1 * | 7/2013 | Kwan | C09B 67/0097 503/201 |
| 2013/0172182 A1 | 7/2013 | Kwan | |
| 2013/0177703 A1 * | 7/2013 | Clayton | B41M 5/287 427/331 |

(Continued)

FOREIGN PATENT DOCUMENTS

| EP | 2511353 | 10/2012 | |
| JP | 63251284 A | * 10/1988 | |
| WO | WO-2018168488 A1 | * 9/2018 | ............. C09B 57/00 |

OTHER PUBLICATIONS

English Machine Translation of JP2601469B2 ("Machine_Translation_Asano_JP_63251284") (Year: 1988).*

(Continued)

*Primary Examiner* — Jennifer A Smith
*Assistant Examiner* — Jeffrey Eugene Barzach
(74) *Attorney, Agent, or Firm* — Ruggiero McAllister & McMahon LLC (57) ABSTRACT

There is a thermochromic ink composition having core-shell microcapsules, an aqueous dispersion medium and a decolorization agent.

14 Claims, 2 Drawing Sheets

(56) References Cited

U.S. PATENT DOCUMENTS

2020/0041359 A1* 2/2020 Aida .................. G05B 19/4183

OTHER PUBLICATIONS

PubChem, "1,1-Bis(4-1,1,-Bis(4-hydroxyphenyl)cyclohexane Depositor-Supplied Synonyms", accessed Feb. 9, 2023, https://pubchem.ncbi.nlm.nih.gov/compound/1_1-Bis_4-hydroxyphenyl_cyclohexane#section=Depositor-Supplied-Synonyms&fullscreen=true (Year: 2023).*
English machine translation of WO-2018168488-A1 (Year: 2018).*
European Search Report dated Jul. 23, 2020 in priority European Patent Application No. 20000039.6 , 5 pgs.

* cited by examiner

Fig. 1A

| Base | % | T room - bottle | | | T room - paper | | |
|---|---|---|---|---|---|---|---|
| | | J+1 | J+7 | J+14 | J+1 | J+7 | J+14 |
| Ref - Eau | 0 | ○ | ○ | ○ | ○ | ○ | ○ |
| TEPA | 7,5 | ○ | ○ | ○ | ○ | ○ | ○ |
| TEPA | 10 | ○ | ○ | ○ | ○ | ○ | ○ |
| Jeffamine D-400 | 7,5 | ○ | ○ | ○ | ○ | ○ | ○ |
| Jeffamine D-401 | 10 | ○ | ○ | ○ | ○ | ○ | ○ |
| Jeffamine T-403 | 7,5 | ○ | ○ | ○ | ○ | ○ | ○ |
| Jeffamine T-403 | 10 | ○ | ○ | ○ | ○ | ○ | ○ |
| DGA | 7,5 | ○ | ○ | ○ | ○ | ○ | ○ |
| DGA | 10 | ○ | ○ | ○ | ○ | ○ | ○ |
| Falamine plus | 7,5 | ○ | ○ | ○ | ○ | ○ | ○ |
| Falamine plus | 10 | ○ | ○ | ○ | ○ | ○ | ○ |
| APMMEA | 7,5 | ○ | ○ | ○ | ○ | ○ | ○ |
| APMMEA | 10 | ○ | ○ | ○ | ○ | ○ | ○ |

○ : Acceptable = no discoloration of the ink

Fig. 1B

| Base | % | T 70°C-bottle J+1 | T 70°C-paper J+1 |
|---|---|---|---|
| Ref - Eau | 0 | X | X |
| TEPA | 7,5 | o | X |
| TEPA | 10 | o | o |
| Jeffamine D-400 | 7,5 | o | o |
| Jeffamine D-401 | 10 | o | o |
| Jeffamine T-403 | 7,5 | o | o |
| Jeffamine T-403 | 10 | o | o |
| DGA | 7,5 | X | X |
| DGA | 10 | X | X |
| Falamine plus | 7,5 | X | X |
| Falamine plus | 10 | X | X |
| APMMEA | 7,5 | o | X |
| APMMEA | 10 | o | X | o: Acceptable = sufficient discoloration of the ink

X: Unacceptable = no discoloration of the ink

IRREVERSIBLY ERASABLE INK COMPOSITION HAVING A DISCOLORATION AGENT

CROSS-REFERENCE TO RELATED APPLICATIONS

The present application claims benefit from European Patent Application N°20 000 039.6, filed on Jan. 28, 2020, as well as from European patent application N°20 315 020.6, filed on Feb. 14, 2020, their contents being incorporated herein by reference in their entireties.

BACKGROUND OF THE DISCLOSURE

1. Field of the Disclosure

The present disclosure relates to thermochromic ink compositions, their preparation and various uses.

2. Description of the Prior Art

Irreversibly decolorizable ink compositions comprising decolorization agents are known in the art, for instance from U.S. Pat. No. 8,182,596 B2 which discloses using basic compounds as decolorization agents. Mentioned examples of decolorization agents include aliphatic diamines such as tetraethylene pentamine or pentaethylene hexamine.

SUMMARY OF THE DISCLOSURE

The present disclosure relates to water-based ink compositions which are thermochromic, i.e. are capable of undergoing a color change by application of a temperature change. Thermochromic inks are known in the art and generally comprise an electron-donative organic compound and an electron-accepting compound which can undergo a chemical reaction that creates a colored reaction product. It is also known in the art that the colored reaction product can be again decolored by the addition of a decolorization agent. Such decolorization agents disrupt the formation of the colored reaction product shifting the reaction equilibria to non-colored or at least less colored reaction products. An example of a decolorization agent is a basic compound such as tetraethylene pentamine or pentaethylene hexamine. The decolorization caused by a decolorization agent may be irreversible in the sense that a temperature change no longer produces a color impression or a color changing effect.

In a first aspect, the present disclosure relates to a thermochromic ink composition comprising core-shell microcapsules, an aqueous dispersion medium and a decolorization agent. The core-shell microcapsules (which may also be considered as core shell microparticles) may comprise a core component and a shell component. The core component may comprise an electron-donative organic compound (component (a)), an electron-accepting compound (component (b)), and a reaction medium for causing a color-forming electron transfer reaction between the components (a) and (b) (component (c)). The component (c) may cause or allow the color-forming electron transfer reaction between the components (a) and (b) above the melting point or softening point of the core component. The shell component may comprise an organic polymer. The decolorization agent may be capable of irreversibly decoloring a colorant formed by the electron transfer reaction between the components (a) and (b). The decolorization agent may be a polyether amine. It may comprise a polyether backbone which comprises one or more primary or secondary amino groups attached to the end of the polyether backbone.

In some embodiments, the polyether backbone may comprise repeat units formed from ethylene oxide or propylene oxide or mixtures thereof.

In some embodiments, the decolorization agent has a weight-average molecular weight of less than about 2000 g/mol, specifically less than about 1000 g/mol, and in particular less than about 500 g/mol.

In some embodiments, the decolorization agent may a weight-average molecular weight of more than about 150 g/mol, specifically more than about 200 g/mol, and in particular more than about 270 g/mol.

In some embodiments, the decolorization agent may have a carbon-to-oxygen ratio of between about 2:1 to about 5:1, specifically between about 2.1:1 to about 4.5:1, and in particular between about 2.2:1 to about 4.0:1.

In some embodiments, the decolorization agent may be characterized in that it does not comprise hydroxyl groups.

In some embodiments, the decolorization agent may be contained in the aqueous dispersion medium. It may be advantageous that the decolorization agent is dissolved or dispersed in the aqueous dispersion medium.

In some embodiments, the reaction medium for causing the electron transfer reaction between the components (a) and (b) may be a waxy material having a melting point of between about 35° C. and about 75° C. It may be advantageous that the waxy material has a melting point of about 37° C. and about 70° C., in particular of about 40° C. and about 65° C.

In some embodiments, the reaction medium for causing the electron transfer reaction between the components (a) and (b) may be selected from esters. It may be advantageous that the reaction medium is selected from fatty acid esters; alcohols, in particular fatty alcohols; waxes; ketones, in particular heptadecan-9-one; and mixtures thereof. It may further be advantageous that the reaction medium is selected from ethylene glycol distearate, dimethyl oxalate, methyl behenate, and 1-octadecanol, or mixtures therefrom.

In some embodiments, the shell component may comprise a polyurea, a polymer derived from melamine, a polymer derived from guanamines, a polyamide, a polyester, a polyurethane, a polycondensation polymer, and mixtures thereof. It may be advantageous that the shell component comprises a polyurea.

In some embodiments, the aqueous dispersion medium may comprise one or more of: a co-solvent, a corrosion inhibitor, an anti-foam agent, a rheology modifier, a film-forming agent, a lubricant, an anti-settling agent, a thickening agent, a UV-protecting agent, a dye, a pigment, a preservative, a fungicide and an antimicrobial agent.

In some embodiments, the electron-donative organic compound may be selected from 3-(4-diethylamino-2-ethoxyphenyl)-3-(1-ethyl-2-methylindol-3-yl)-4-azaphthalide (Blue 63, CAS number 69898-40-4), 2'-(dibenzylamino)-6'-(diethylamino)fluorane (CAS number 34372-72-0), N,N-dimethyl-4-[2-[2-(octyloxy)phenyl]-6-phenyl-4-pyridinyl]benzenamine (yellow CK37, CAS number 144190-25-0), 7-(4-diethylamino-2-hexyloxyphenyl)-7-(1-ethyl-2-methyl-1H-indol-3-yl)-7H-furo[3,4-b]pyridin-5-one (Blue 203, CAS number 98660-18-5), 2-(2,4-dimethylphenylamino)-3-methyl-6-diethylaminofluoran (Black 15, CAS number: 36431-22-8), and 3,3-bis-(1-butyl-2-methyl-indol-3-yl)-3H-isobenzofuran-1-one (Red 40, CAS number 50292-91-6).

In some embodiments, the electron-accepting compound may be selected from 2,2-bis(4-hydroxy-3-methylphenyl)

propane (Bisphenol C, CAS number 79-97-0), 4-hexyl-1,3-dihydroxybenzene (4-hexylresorcinol, CAS number 136-77-6), 4,4'-cyclohexylidenebisphénol (BPZ, CAS number 843-55-0), 4,4'-(hexafluoroisopropylidene)diphenol (Bisphenol AF, CAS number 1478-61-1), 4,4'-(1-phenylethylidene)bisphenol (CAS number 1571-75-1), 2,2'-dihydroxybiphenyl (CAS number 1806-29-7), 4,4'-(1,4-phenylenediisopropylidene)bisphenol (CAS number 2167-51-3), 1,1-bis(4-hydroxy-3-methylphenyl)cyclohexane (CAS number 2362-14-3), 9,9-bis(4-hydroxyphenyl)fluorene (CAS number 3236-71-3), 4,4'-(1,3-phenylenediisopropylidene)bisphenol (CAS number 13595-25-0), 1,1,1-tris(4-hydroxyphenyl)ethane (CAS number 27955-94-8), 4,4'-(2-ethylhexylidene)diphenol (CAS number 74462-02-5), α,α,α'-tris(4-hydroxyphenyl)-1-ethyl-4-isopropylbenzene (CAS number 110726-28-8), 3,5,4'-trihydroxy-trans-stilbene (resveratrol, CAS number 501-36-0).

In a second aspect, the present disclosure relates to a writing instrument or a writing substrate comprising the thermochromic ink composition as described above for the first aspect of the present disclosure. It may be advantageous that the writing instrument is selected from point pens, brush pens, colored pencils, markers, highlighters, chalks and felt pens, and in particular from ballpoint pens comprising an erasing tool for erasing writing by friction such as a rubbery erasing tool.

In a third aspect, the present disclosure relates to a process of preparing the thermochromic ink composition as disclosed above for the first aspect of the present disclosure. The process may comprise the steps of dispersing a composition comprising core-shell microcapsules in an aqueous dispersion medium and adding a decolorization agent. It may be advantageous that the decolorizing agent is dissolved or dispersed in the aqueous dispersion medium. The core-shell microcapsules may comprise a core component and a shell component. The core component may comprise an electron-donative organic compound (compound (a)), an electron-accepting compound (compound (b)), and a reaction medium for causing a color-forming electron transfer reaction between the components (a) and (b) (compound (c)). The reaction medium may cause or allow the reaction between components (a) and (b) above the melting point or softening point of the core component. The shell component may comprise an organic polymer. The decolorization agent may be capable of irreversibly decoloring a colorant formed by the electron transfer reaction between the components (a) and (b). The decolorization agent may be a polyether amine. It may comprise a polyether backbone which comprises one or more primary or secondary amino groups attached to the end of the polyether backbone.

In a fourth aspect, the present disclosure relates to a process of writing or printing a thermochromic ink composition according to the above first aspect of the disclosure onto a substrate. It may be advantageous that the substrate is a porous support.

DETAILED DESCRIPTION OF THE DRAWINGS

Hereinafter, a detailed description will be given of the present disclosure. The terms or words used in the description and the claims of the present disclosure are not to be construed limitedly as only having common-language or dictionary meanings and should, unless specifically defined otherwise in the following description, be interpreted as having their ordinary technical meaning as established in the relevant technical field. The detailed description will refer to specific embodiments to better illustrate the present disclosure, however, it should be understood that the presented disclosure is not limited to these specific embodiments.

In a first aspect, the present disclosure relates to a thermochromic ink composition comprising core-shell microcapsules, an aqueous dispersion medium and a decolorization agent.

The size of the core-shell microcapsules is not particularly limited as long as the size of microcapsules in the nanometer or micrometer-range. In some embodiments, the microcapsules may have a size of about 0.1 μm to about 100 μm, in particular about 0.1 μm to about 50 μm, specifically about 0.5 to about 20 μm, The microcapsules may generally have a spherical or substantially spherical shape and, thus, their size can be determined by conventional means such as microscopy or electron microscopy. In these cases, the measured 2-dimensional representation of the microcapsule diameter may be seen as representative for the afore-mentioned size of the microcapsules.

The core-shell microcapsules may further comprise a core component and a shell component. The core component may comprise an electron-donative organic compound (component (a)). It may further comprise an electron-accepting compound (component (b)). It may further comprise a reaction medium for causing a color-forming electron transfer reaction between the components (a) and (b) (component (c)). It should be understood that the core component may also comprise further components such as pigments or additives. Alternatively, the core component may consist of the components (a), (b) and (c).

The electron-donative organic compound (component (a)) may be a compound which develops a color impression by reacting with an electron-receptive compound. The electron-donative color developing organic compound is not particularly limited, and any of known electron-donative color developing organic compounds (for example, a leuco dye) can be used. Specifically, for example, the following compounds may be used as the electron-donative color developing organic compound, in particular leuco-dyes, such as: fluoranes, for example, 1,2-benzo-6-(N-ethyl-N-isoamylamino)fluoran, 2-anilino-3-methyl-5-(N-ethyl-N-n-propylamino)fluoran, 2-chloro-3-methyl-6-(4-di-n-butylamino-anilino) fluoran, 3-diethyl-amino-6-benzyloxyfluoran, 3,6-diphenylaminofluoran, 2'-[(2-chlorophenyl) amino]-6'-(dibutylamino)spiro[isobenzofluoran-1(3H), 9'-(9H) xanthene]-3-one, 6'-[ethyl(4-methylphenyl)amino]-2'-methyl-spiro[isobenzofluoran-1(3H), 9'-(9H)xanthe-ne]-3-one, and 6-(dimethylaminoamino)-3,3-bis[4-(dimethylamino)phenyl]-1(3H)-isobenzo-fluoran;

phenothiazines, for example, benzoyl leucomethylene blue, ethyl leucomethylene blue; indolines, for example, 2-(phenyliminoethylidene)-3,3-dimethylindoline; spiropyrans, for example, 1,3,3-trimethyl-indolino-7-chloro-β-naphthospiropyran, N-3,3-trimethyl-indolinobenzospiropyran; leucoauramines, for example, N-acetylauramine and N-phenylauramine; rhodamine lactams, for example, rhodamine B lactam; polyarylcarbinols, for example, crystal violet carbinol and malachite green carbinol; diphenyl methane phthalides, for example, 3,3-bis(p-dimethylaminophenyl)-6-dimethylaminophthalide, 3,3-bis(p-dimethylaminophenyl)-phthalide; triphenyl methane phthalides, for example, crystal violet lactone, malachite green lactone; phenylindolylphthalides, for example 3-(4-diethylaminophenyl)-3-(1-ethyl-2-methylindole-3-yl)phthalide, 3-(2-methyl-4-diethylamino)phenyl-3-(1-(2-methoxy-ethyl)-2-methylindole-3-yl) phthalide; diphenylmethaneazaphthalides, for example, 3,3-bis-(2-ethoxy-4-diethylaminophenyl)-4-azaphthalide; phenylindolylazaphthalides, for example, 3-(2-ethoxy-4-diethylaminophenyl)-3-(1-ethyl-2-methylindole-3-yl)-4-azaphthalide, 3-(4-diethylamino-2-methylphenyl)-3-(1-ethyl-2-methylindole-3-yl)-4-azaphthalide; styrylquinolines, for example, 2-(3-methoxy-4-dodecoxystyryl)quinoline; pyridines, for example, 2,6-bis(6-n-butoxyphenyl)-4-(4-dimethylaminophenyl)pyridine; quinazolines, for example, 2-(4-dimethylaminophenyl)-4-methoxyquinazoline, 2-(4-dimethylaminophenyl)-4-(1-chlorophenyloxy)quinazoline; bisquinazolines, for example, 4,4'-(ethylenedioxy)-bis[2-(4-diethylaminophenyl) quinazoline], 4,4'-(ethylenedioxy)-bis[2-(4-piperidinophenyl)quinazoline]; ethylenophthalides, for example, 3,3-bis[1,1-bis-(p-dimethylaminophenyl)ethyleno-2]phthalide, 3,3-bis[1,1-bis-(2-methyl-4-dimethylaminophenyl)ethyleno-2] phthalide; ethylenoazaphthalides, for example, 3,3-bis[1,1-bis-(p-dimethylaminophenyl)ethyleno-2]-4-azaphthalide, 3,3-bis[1,1-bis-(p-dimethylaminophenyl)ethyleno-2]-4,7-diaza-phthalide; and fluorenes, for example, 3,6-bis(dimethylamino)fluorenespiro(9.3')-4'-azaphthalide, 3,6-bis(dimethylamino)fluorenespiro(9.3')-7'-azaphthalide.

In some embodiments, the electron-donative organic compound may be selected from 3-(4-diethylamino-2-ethoxyphenyl)-3-(1-ethyl-2-methylindol-3-yl)-4-azaphthalide (Blue 63, CAS number 69898-40-4), 2-(dibenzylamino)-6-(diethylamino)fluorane (CAS number 34372-72-0)), N,N-dimethyl-4-[2-[2-(octyloxy)phenyl]-6-phenyl-4-pyridinyl]benzenamine (yellow CK37, CAS number 144190-25-0), 7-(4-diethylamino-2-hexyloxyphenyl)-7-(1-ethyl-2-methyl-1H-indol-3-yl)-7H-furo[3,4-b]pyridin-5-one (Blue 203, CAS number 98660-18-5), 2-(2,4-dimethylphenylamino)-3-methyl-6-diethylaminofluoran (Black 15, CAS number: 36431-22-8), and 3,3-bis-(1-butyl-2-methyl-indol-3-yl)-3H-isobenzofuran-1-one (Red 40, CAS number 50292-91-6).

It should be understood that a single electron-donative organic compound may be used or that a plurality of electron-donative organic compounds may be used. This may allow to fine-tune the perceived color impression.

It may be advantageous that the content of the electron-donative organic compound contained in the ink composition is from about 0.01% to about 15% by weight, and in particular from about 0.1% to about 10% by weight, based on the ink composition as a whole.

It may be advantageous that the electron-donative organic compound is contained in the microcapsules in an amount of from about 0.1% by weight to about 30% by weight, and in particular from about 1% by weight to about 20% by weight, of microcapsules.

The electron-accepting compound (component (b)) may be a compound which reacts with the electron-donative organic compound under formation of a colorant or of a color impression. The electron-accepting compound may be a compound which has an active proton, a pseudo acidic compound or a compound having an electron hole.

The electron-accepting compound is not particularly limited. For example, a compound having a phenolic hydroxyl group (such as phenol, o-cresol, m-octylphenol, n-dodecylphenol, n-stearylphenol, bisphenols, and resorcinols), carboxylic acids and the metal salts thereof (such as zinc salicylate, zinc 3,5-di(alpha-methylbenzyl) salicylate), acidic phosphate esters and metal salts thereof, urea thiourea-based compound and derivatives thereof and 1,2,3-triazole and derivatives thereof may be used as the electron-accepting compound.

In some embodiments, the electron-accepting compound may be selected from 2,2-bis(4-hydroxy-3-methylphenyl) propane (Bisphenol C, CAS number 79-97-0), 4-hexyl-1,3-dihydroxybenzene (4-hexylresorcinol, CAS number 136-77-6), 4,4'-cyclohexylidenebisphénol (BPZ, CAS number 843-55-0), 4,4'-(hexafluoroisopropylidene)diphenol (Bisphenol AF, CAS number 1478-61-1), 4,4'-(1-phenylethylidene)bisphenol (CAS number 1571-75-1), 2,2'-dihydroxybiphenyl (CAS number 1806-29-7), 4,4'-(1,4-phenylenediisopropylidene)bisphenol (CAS number 2167-51-3), 1,1-bis(4-hydroxy-3-methylphenyl)cyclohexane (CAS number 2362-14-3), 9,9-bis(4-hydroxyphenyl)fluorene (CAS number 3236-71-3), 4,4'-(1,3-phenylenediisopropylidene)bisphenol (CAS number 13595-25-0), 1,1,1-tris(4-hydroxyphenyl)ethane (CAS number 27955-94-8), 4,4'-(2-ethylhexylidene)diphenol (CAS number 74462-02-5), α,α,α'-tris(4-hydroxyphenyl)-1-ethyl-4-isopropylbenzene (CAS number 110726-28-8), 3,5,4'-trihydroxy-trans-stilbene (resveratrol, CAS number 501-36-0).

It should be understood that a single electron-accepting compound may be used or that a plurality of electron-accepting compounds may be used. This may allow to fine-tune the perceived color impression.

It may be advantageous that the content of the electron-receptive compound is from about 0.01% to about 15% by weight, and in particular from about 0.1% to about 10% by weight, of the ink composition as a whole.

It may be advantageous that the electron-receptive compound is contained in the microcapsules in an amount of from about 0.1% by weight to about 30% by weight, and in particular from about 1% by weight to about 20% by weight, of microcapsules.

The reaction medium for causing a color-forming electron transfer reaction between the components (a) and (b) (component (c)) may cause or allow the color-forming electron transfer reaction between the components (a) and (b) above the melting point or softening point of the core component. Without wishing to be bound by theory, the component (c) may act as a matrix surrounding and isolating the components (a) and (b) from each other, thereby substantially preventing the color-forming electron transfer reaction between the components (a) and (b) at temperatures which are below the melting point or softening point the core component. It should be understood that the melting point or softening point the core component is largely correlated to the melting or softening point of the reaction medium (c)), but may also be additionally subject to the presence of the components (a) and (b) and any other optional components. The melting point or softening point the core component may be determined by established means, such as differential thermal analysis (DTA) or differential scanning calorimetry (DSC). At about the softening or melting temperature of the core component, the components (a) and (b) may be sufficiently mobile within the reaction medium (c) to allow the electron transfer reaction between the components (a) and (b).

In some embodiments, the core component as such may be characterized by having a melting point or softening point of between about 35° C. and about 75° C. It may be advantageous that the core component has a melting point or softening point of about 37° C. and about 70° C., in particular of about 40° C. and about 65° C. The melting point or softening point of the core component may be determined by established means, such as differential thermal analysis (DTA) or differential scanning calorimetry (DSC).

In some embodiments, the reaction medium (component (c)) for causing the electron transfer reaction between the components (a) and (b) may be a waxy material having a melting point of between about 35° C. and about 75° C. It should be understood that the term "waxy material" may refer to a wax or a material having wax-like properties, such as a malleable solid state at ambient temperatures and a defined melting point (in contrast to a melting point range as in case of many polymeric materials). It may be advantageous that the waxy material has a melting point of about 37° C. and about 70° C., in particular of about 40° C. and about 65° C. The melting point of the waxy material may be determined by established means, such as differential thermal analysis (DTA) or differential scanning calorimetry (DSC). These melting characteristics may allow a writing made with the thermochromic compositions of the present disclosure to be erased by frictional heat generated by rubbing a rubbery eraser over a substrate such as paper. The reaction medium for causing the electron transfer reaction between the components (a) and (b) may include one or more of the following compounds: aliphatic acids such as lauric acid, myristic acid, palmitic acid, stearic acid, and behenic acid; aliphatic acid esters such as methyl behenate, stearyl laurate, stearyl stearate, stearyl palmitate, behenyl behenate; aliphatic acid anhydride such as myristic anhydride, palmitic anhydride, stearic anhydride; acyl glycerin such as 2-monolaurin glycerin, 2-monomyristine glycerin, 2-mono-palmitine glycerin, 1-palmitoyl-2-olein glycerin, and 1-stearoyl-2-olein glycerin, glycerin monostearate, a mixture of glycerin monostearate with glycerin distearate, and a mixture of glycerin distearate with glycerin tristearate; alcohols such as cetyl alcohol, stearyl alcohol, arachinyl alcohol, and 1-docosanol; aliphatic acid amides such as recinoleic acid amide and oleic acid amide; paraffin waxes; pentaerythritol tetra stearate; pentaerythritol tetra palmitate; ethylene glycol distearate; propylene glycol mono-behenate; distearyl thiodipropionate; sorbitan tristearate; and sorbitan palmitate.

In some embodiments, the reaction medium for causing the electron transfer reaction between the components (a) and (b) may be selected from esters. It may be advantageous that the reaction medium is selected from fatty acid esters; alcohols, in particular fatty alcohols; waxes; ketones, in particular heptadecan-9-one; and mixtures thereof. It may further be advantageous that the reaction medium is selected from ethylene glycol distearate, dimethyl oxalate, methyl behenate, and 1-octadecanol, or mixtures therefrom.

It may be advantageous that the content of the reaction medium (component (c)) for causing the electron transfer reaction between the components (a) and (b) is from about 2% to about 50% by weight, and in particular from about 3% to about 45% by weight, of the ink composition as a whole.

It may be advantageous that the content of the reaction medium (component (c)) for causing the electron transfer reaction between the components (a) and (b) is an amount of from about 20% by weight to about 95% by weight, and in particular from about 30% by weight to about 90% by weight, of microcapsules.

The shell component may comprise an organic polymer. The organic polymer may encapsulate the core component and may contribute to the dispersion of the core component in the aqueous dispersion medium. In some embodiments, the shell component may comprise an optionally crosslinked organic polymer comprising water solubility imparting functional groups such as hydroxyl groups, amino groups, amide groups, ionic groups, ionizable groups, and the like.

In some embodiments, the shell component may comprise a polyurea, a polymer derived from melamine, a polymer derived from guanamines, a polyamide, a polyester, a polyurethane, a polycondensation polymer, and mixtures thereof. It may be advantageous that the shell component comprises a polyurea.

The core-shell microcapsule of the present disclosure may be dispersed in an aqueous dispersion medium. The aqueous dispersion medium may comprise water or water in admixture with one or more further solvents such as an alcohol. The content of the aqueous dispersion medium is not particularly limited. For example, the content of the aqueous dispersion medium can be in a range of from about 40% by weight to about 95% by weight, in particular from about 50% by weight to about 90% by weight, of the ink composition as a whole. The content or core-shell microcapsule can be in the range of from about 10% by weight to about 50% by weight, in particular from about 15% to about 40% by weight, of the ink composition as a whole.

The thermochromic ink composition may further comprise a decolorization agent. The decolorization agent may be capable of irreversibly decoloring a colorant formed by the electron transfer reaction between the electron-donative organic compound and the electron-accepting compound. Without wishing to be bound by theory, the decolorization agent may interfere with the color-developing electron-transfer reaction between the electron-donative organic compound and the electron-accepting compound, either directly by inhibiting the function of the electron-accepting compound or indirectly by generating a deprotonated species which inhibits the function of the electron-accepting compound. U.S. Pat. No. 8,182,596 B2 discloses that the effectiveness of the decolorization agent in decolorizing the thermochromic ink composition depends on the strength of the basicity of the decolorization agent. However, the inventors of the present disclosure have found that the effectiveness of the decolorization agent not only depends on the strength of the basicity but also on further factors. Without wishing to be bound by theory, the effectiveness of the decolorization agent in decolorizing the thermochromic ink composition is also influenced by the hydrophilcity of the compound and the ability of the decolorization agent to penetrate and permeate the shell and core component of the core-shell microcapsules above the melting or softening point of the core component. At the same time, again without wishing to be bound by theory, sufficient hydrophobicity may also be important since the ability of the decolorization agent to penetrate and permeate the shell and core component below the melting or softening point of the core component must be sufficiently low to prevent a discoloration of a colorant formed by the electron transfer reaction between the electron-donative organic compound and the electron-accepting compound during storage of the thermochromic ink composition. The present inventors have surprisingly found that such a balance may be found in case that the decolorization agent is a polyether amine which comprises a polyether backbone comprising one or more primary or secondary amino groups attached to the end of the polyether backbone.

In some embodiments, the polyether backbone may comprise repeat units formed from ethylene oxide or propylene oxide or mixtures thereof. In some embodiments, it may be advantageous that the polyether backbone may comprise repeat units formed from propylene oxide.

In some embodiments, the decolorization agent has a weight-average molecular weight of less than about 2000 g/mol, specifically less than about 1000 g/mol, and in particular less than about 500 g/mol.

In some embodiments, the decolorization agent may have a weight-average molecular weight of more than about 150 g/mol, specifically more than about 200 g/mol, and in particular more than about 270 g/mol.

In some embodiments, the decolorization agent may have a carbon-to-oxygen ratio of between about 2:1 to about 5:1, specifically between about 2.1:1 to about 4.5:1, and in particular between about 2.2:1 to about 4.0:1.

In some embodiments, the decolorization agent may be characterized in that it does not comprise hydroxyl groups.

In some embodiments, the polyether backbone may comprise repeat units formed from propylene oxide and the decolorization agent has a weight-average molecular weight of less than about 2000 g/mol, specifically less than about 1000 g/mol, and in particular less than about 500 g/mol; and a weight-average molecular weight of more than about 150 g/mol, specifically more than about 200 g/mol, and in particular more than about 270 g/mol.

In some embodiments, the polyether backbone may comprise repeat units formed from propylene oxide and has a carbon-to-oxygen ratio of between about 2:1 to about 5:1, specifically between about 2.1:1 to about 4.5:1, and in particular between about 2.2:1 to about 4.0:1.

In some embodiments, the polyether backbone may comprise repeat units formed from propylene oxide; the decolorization agent has a weight-average molecular weight of less than about 2000 g/mol, specifically less than about 1000 g/mol, and in particular less than about 500 g/mol; and a weight-average molecular weight of more than about 150 g/mol, specifically more than about 200 g/mol, and in particular more than about 270 g/mol; and the polyether backbone may comprise repeat units formed from propylene oxide and has a carbon-to-oxygen ratio of between about 2:1 to about 5:1, specifically between about 2.1:1 to about 4.5:1, and in particular between about 2.2:1 to about 4.0:1.

In some embodiments, the decolorization agent comprises a compound of formula (I) to (I)

wherein x represents a polymerization degree of between about 2 to about 33, in particular between about 2.5 to about 10, more specifically between about 2.5 and about 6.1, and more specifically about 2.5 or about 6.1.

In some embodiments, the decolorization agent may comprise a compound of formula (II).

(II)

wherein R represents H or a $C_1$-$C_4$-alkyl group, in particular ethyl; n represents 0 or 1, in particular 1; x, y, and z represent the polymerization degree of the respective monomeric unit, wherein the sum of x, y and z is between about 3 and about 20, in particular between about 4 and about 8, and more specifically between about 5 and about 6.

In some embodiments, the decolorization agent may be contained in the aqueous dispersion medium. In some embodiments, the decolorization agent may alternatively be contained in the core component. It may be advantageous that the decolorization agent is dissolved or dispersed in the aqueous dispersion medium. It is further contemplated that the decolorization agent may be contained in the aqueous dispersion medium in encapsulated form. In some embodiments, the aqueous dispersion may comprise microcapsules, in particular microcapsules comprising a gelatin-based wall, which contain the decolorization agent.

In some embodiments, the aqueous dispersion medium may comprise one or more of: a co-solvent, a corrosion inhibitor, a shear-thinning agent, an anti-foam agent, a rheology modifier, a film-forming agent, a lubricant, an anti-settling agent, a thickening agent, a UV-protecting agent, a dye, a pigment, a preservative, a fungicide and an antimicrobial agent.

In some embodiments, it may be advantageous that the core shell microcapsules and/or the aqueous dispersion medium comprises a dye or a pigment. Adding such an additional coloring agent allows to obtain a second color impression after irreversibly erasing the colorant formed by the electron transfer reaction between the electron-donative organic compound and the electron-accepting compound with the decolorization agent.

In a second aspect, the present disclosure relates to a writing instrument or a writing substrate comprising the thermochromic ink composition as described above for the first aspect of the present disclosure. It may be advantageous that the writing instrument is selected from point pens, brush pens, colored pencils, markers, highlighters, chalks and felt pens, and in particular from ballpoint pens comprising an erasing tool for erasing writing by friction such as a rubbery erasing tool.

It should be understood that the embodiments referred to above with respect to the first aspect of the disclosure equally apply to and are combinable with the second aspect of the disclosure.

In a third aspect, the present disclosure relates to a process of preparing the thermochromic ink composition as disclosed above for the first aspect of the present disclosure. The process may comprise the steps of dispersing a composition comprising core-shell microcapsules in an aqueous dispersion medium and adding a decolorization agent. It may be advantageous that the decolorizing agent is dissolved or dispersed in the aqueous dispersion medium. The core-shell microcapsules may comprise a core component and a shell component. The core component may comprise an electron-donative organic compound (compound (a)), an electron-accepting compound (compound (b)), and a reaction medium for causing a color-forming electron transfer reaction between the components (a) and (b) (compound (c)). The reaction medium may cause or allow the reaction between components (a) and (b) above the melting point or softening point of the core component. The shell component may comprise an organic polymer. The decolorization agent may be capable of irreversibly decoloring a colorant formed by the electron transfer reaction between the components (a) and (b). The decolorization agent may be a polyether amine. It may comprise a polyether backbone which comprises one or more primary or secondary amino groups attached to the end of the polyether backbone.

It should be understood that the embodiments referred to above with respect to the first aspect of the disclosure equally apply to and are combinable with the third aspect of the disclosure.

In a fourth aspect, the present disclosure relates to a process of writing or printing a thermochromic ink composition according to the above first aspect of the disclosure onto a substrate. It may be advantageous that the substrate is a porous support.

It should be understood that the embodiments referred to above with respect to the first aspect of the disclosure equally apply to and are combinable with the fourth aspect of the disclosure.

In the following the present disclosure will be further elaborated by way of Examples.

EXAMPLES

Preparation of a Thermochromic Ink Composition:

A slurry was prepared in a first beaker by mixing, under stirring with a bar magnet, 19.43 wt % of ethylene glycol distearate, 0.53 wt % of Blue 203, 1.05 wt % of Bisphenol AF, and 3.00 wt % of hexamethylene diisocyanate, at a temperature of 70° C. during 30 minutes. 67.01 wt % of deionized water was mixed with 1.00 wt % of polyvinyl alcohol (PVA) in an ULTRA-THURRAX® disperser, before adding the mixture of ethylene glycol distearate, Blue 203, Bisphenol AF, and hexamethylene diisocyanate, and agitating during 3 minutes. The mixture was placed under stirring with a bar magnet during 3 minutes. 1.00 wt % of hexamethylene diamine was added and left to react with the isocyanate present in the mixture during 3 hours, to form polyurea microcapsules. A slurry of core-shell microcapsules dispersed in water was obtained, the microcapsules having a diameter Dv50 (median value for a volume distribution) of 6.6 μm and a pH of 8.4.

In a second beaker, 10 wt % of glycerin (Henry Franc), 0.19 wt % of biocide Acticide® MBS (Thor), and 0.20 wt % of tolyltriazole (Additin® RC 8221, Lanxess), were mixed under stirring with a bar magnet during 15 minutes. 0.30 wt % of xanthan gum (Jungbunzlauer) was added, and the mixture homogenized under stirring during 15 minutes. 60% of slurry obtained previously was slowly added to the mixture. The mixture was then homogenized under stirring during 2 hours at a temperature of 35° C. 0.30 wt % of a defoamer (Moussex® S 9092, Syntron) was added, and the mixture homogenized under stirring at a temperature of 35° C. for another 15 minutes. 1.00 wt % of polyvinylpyrrolidone (Luvitec® K17, BASF) was added, and the mixture homogenized under stirring at a temperature of 35° C. for another 15 minutes.

Addition of Decolorization Agent to the Thermochromic Ink Composition:

The following bases were added to the thermochromic ink composition prepared above, either 7.5% or 10% by weight depending on the examples and 20.51% or 18.01% of deionized water have been added respectively. The bases are commercially available by Sigma Aldrich, Lorama or Huntsman:

TABLE 1

| Sample | Commercial Name | Chemical Nature | Conc. (wt.-%) |
|---|---|---|---|
| Comparative Example 1 | TEPA | tetraethylene pentamine | 7.5 |
| Comparative Example 2 | DGA | diglycol amine | 7.5 |
| Comparative Example 3 | Falamine Plus | alkanolamide | 7.5 |
| Comparative Example 4 | APMMEA | n-aminopropyl monomethyl ethanol amine | 7.5 |
| Comparative Example 5 | TEPA | tetraethylene pentamine | 10 |
| Comparative Example 6 | DGA | diglycol amine | 10 |
| Comparative Example 7 | Falamine Plus | alkanolamide | 10 |
| Comparative Example 8 | APMMEA | n-aminopropyl monomethyl ethanol amine | 10 |
| Comparative Example 9 | | No addition | — |
| Example 1 | Jeffamine D-400 | diamine of formula (I) | 7.5 |
| Example 2 | Jeffamine T-403 | triamine of formula (II) | 7.5 |
| Example 3 | Jeffamine D-400 | diamine of formula (I) | 10 |
| Example 4 | Jeffamine T-403 | triamine of formula (II) | 10 |

Testing of Discoloration Performance:

The samples were subjected to testing the discoloration performance. The individual samples obtained above were exposed to the following conditions:

a) at room temperature, in bottle and in paper (for 14 days)
b) at 70° C., in bottle, and on paper (after 1 day)

Under condition a), the color should remain stable. Under condition b), the discoloration should be complete.

Figure 1A:
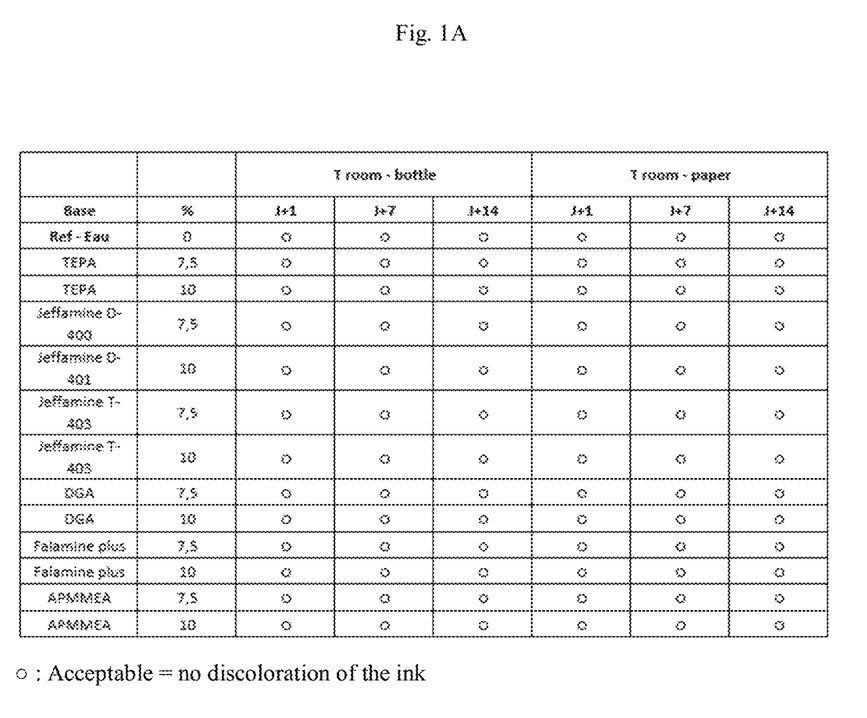
FIGS. 1A and 1B show the results obtained by visual inspection for Examples 1 to 4 and Comparative Examples 1 to 9.
Figure 1B:
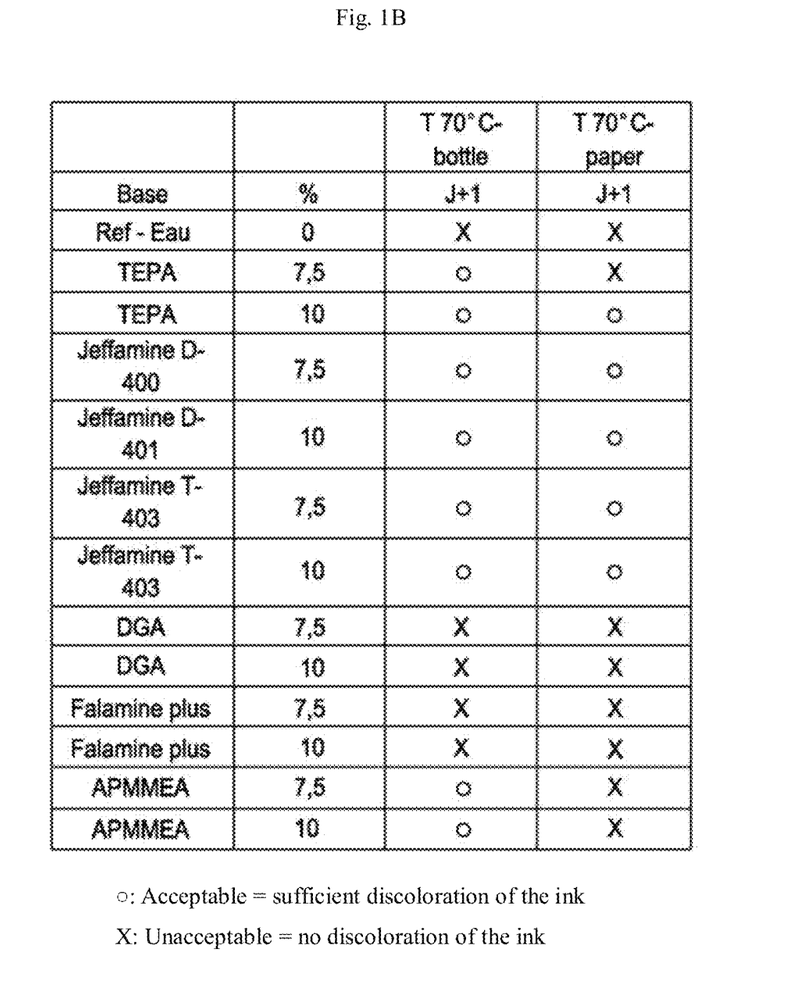

In a first step, the samples were visually evaluated. The results are given in FIG. 1.A and FIG. 1.B. In FIG. 1A, the samples were subjected to testing the discoloration performance with the following conditions: at room temperature, in bottle and in paper (for 14 days). In FIG. 1B, samples were subjected to testing the discoloration performance with following conditions: at 70° C., in bottle, and on paper (after 1 day).

As can be seen in FIG. 1A, the compositions according to the present disclosure (Examples 1 to 4) provide a stable color impression even after prolonged storage at ambient temperatures. Moreover, as can be seen in FIG. 1B, the compositions according to the present disclosure (Examples 1 to 4) are rapidly discolored, as evidenced by complete discoloration after 1 day of exposure at 70° C.

In a second step, the discoloration of selected samples was tested colorimetrically:

To demonstrate the residual color presence, color is measured on paper (Iso-paper 3NT-41) before and after heating at 70° C. during 5 min, with a spectrophotometer Konica Minolta CM-2600d, in Lab* color system (Illuminant D65, Observer 10°). Note that the samples were blue before discoloration, as indicated by the negative b*-value. The results reported in below table 2 were obtained:

TABLE 2

| | Before heating | | | After heating at 70° C. (5 min on paper Iso-paper 3NT-41) | | |
|---|---|---|---|---|---|---|
| Sample | L* | a* | b* | L* | a* | b* |
| Comp. Ex. 1 | 60.07 | −4.40 | −32.19 | 65.35 | −5.33 | −27.62 |
| Comp. Ex. 4 | 60.89 | −3.51 | −30.69 | 63.78 | −3.70 | −27.47 |

TABLE 2-continued

| | Before heating | | | After heating at 70° C. (5 min on paper Iso-paper 3NT-41) | | |
|---|---|---|---|---|---|---|
| Sample | L* | a* | b* | L* | a* | b* |
| Example 1 | 67.29 | −3.70 | −22.40 | 80.27 | 0.21 | −4.84 |
| Example 2 | 64.34 | −3.43 | −25.07 | 76.95 | −1.89 | −11.33 |

With these data it is possible to calculate:
ΔL, which indicates if the sample is more or less clear after heating.
Δb, which indicates if the sample is more or less blue after heating.
ΔE, which indicates if the color has changed after heating.
ΔE is calculated with the following formula:

$$\Delta E = \sqrt{(\Delta L^*)^2 + (\Delta a^*)^2 + (\Delta b^*)^2}$$

The following results were obtained for the samples before and after heating at 70° C.:

TABLE 3

| Sample | ΔL* | Δb* | ΔE |
|---|---|---|---|
| Comparative Example 1 | 5.28 | 4.56 | 7.04 |
| Comparative Example 4 | 2.90 | 3.22 | 4.34 |
| Example 1 | 12.99 | 17.56 | 22.19 |
| Example 2 | 12.62 | 13.74 | 18.72 |

As can be seen from above table 3, the Examples 1 and 2 are clearer and more discolored (as evident from ΔE and Δb*) after heating than the Comparative Examples 1 and 4. This indicates that—despite similar strength of base—the effectiveness of the discoloration agents according to the present disclosure (Examples 1 and 2) to eradicate the colorant formed by thermochromic ink composition is better than that of the comparative discoloration agents (Comparative Examples 1 and 4).

Although the preferred embodiments of the present disclosure have been disclosed for illustrative purposes, those skilled in the art will appreciate that various modifications and alterations are possible, without departing from the spirit of the present disclosure. It is also to be understood that such modifications and alterations are incorporated in the scope of the present disclosure and the accompanying claims.

The invention claimed is:

1. A thermochromic ink composition comprising core-shell microcapsules, an aqueous dispersion medium and a decolorization agent,
wherein the core-shell microcapsules comprise a core component and a shell component, wherein the core component comprises (a) an electron-donative organic compound, (b) an electron-accepting compound, and (c) a reaction medium for causing a color-forming electron transfer reaction between the components (a) and (b) above the melting or softening point of the core component, wherein the shell component encapsulates the core component, and wherein the shell component comprises an organic polymer;
wherein the decolorization agent is dissolved or dispersed in the aqueous dispersion medium;
wherein the decolorization agent is capable of irreversibly decoloring a colorant formed by the electron transfer reaction between the components (a) and (b); wherein the decolorization agent is a polyether amine comprising a polyether backbone comprising one or more primary amino groups attached to the end of the polyether backbone, and wherein the polyether backbone further comprises repeat units formed from ethylene oxide or propylene oxide or mixtures thereof; and wherein the decolorization agent has a weight-average molecular weight of more than 270 g/mol and less than 2000 g/mol.

2. The thermochromic ink composition according to claim 1, wherein the decolorization agent has a carbon-to-oxygen ratio of 2:1 to 5:1.

3. The thermochromic ink composition according to claim 1, wherein the decolorization agent does not comprise hydroxyl groups.

4. The thermochromic ink composition according to claim 1, wherein the reaction medium for causing the electron transfer reaction between the components (a) and (b) is a waxy material having a melting point of 35° C. to 75° C.

5. The thermochromic ink composition according to claim 1, wherein the reaction medium for causing the electron transfer reaction between the components (a) and (b) is selected from esters, alcohols, waxes, ketones, and mixtures thereof.

6. The thermochromic ink composition according to claim 1, wherein the shell component comprises a polyurea, a polymer derived from melamine, a polymer derived from guanamines, a polyamide, a polyester, a polyurethane, a polycondensation polymer, and mixtures thereof.

7. The thermochromic ink composition according to claim 1, wherein the aqueous dispersion medium comprises one or more of: a co-solvent, a corrosion inhibitor, an anti-foam agent, a rheology modifier, a film-forming agent, a lubricant, an anti-settling agent, a thickening agent, a UV-protecting agent, a dye, a pigment, a preservative, a fungicide and an antimicrobial agent.

8. The thermochromic ink composition according to claim 1, wherein the electron-donative organic compound, is a leuco-dye, in particular one selected from 3-(4-diethylamino-2-ethoxyphenyl)-3-(1-ethyl-2-methylindol-3-yl)-4-azaphthalide (Blue 63, CAS number 69898-40-4), 2'-(dibenzylamino)-6'-(diethylamino)fluorane (CAS number 34372-72-0), N,N-dimethyl-4-[2-[2-(octyloxy)phenyl]-6-phenyl-4-pyridinyl]benzenamine (yellow CK37, CAS number 144190-25-0), 7-(4-diethylamino-2-hexyloxyphenyl)-7-(1-ethyl-2-methyl-1H-indol-3-yl)-7H-furo[3,4-b]pyridin-5-one (Blue 203, CAS number 98660-18-5), 2-(2,4-dimethylphenylamino)-3-methyl-6-diethylaminofluoran (Black 15, CAS number: 36431-22-8), and 3,3-bis-(1-butyl-2-methyl-indol-3-yl)-3H-isobenzofuran-1-one (Red 40, CAS number 50292-91-6).

9. The thermochromic ink composition according to claim 1, wherein the electron-accepting compound is selected from 2,2-bis(4-hydroxy-3-methylphenyl)propane (Bisphenol C, CAS number 79-97-0), 4-hexyl-1,3-dihydroxybenzene (4-hexylresorcinol, CAS number 136-77-6), 4,4'-cyclohexylidenebisphenol (BPZ, CAS number 843-55-0), 4,4'-(hexafluoroisopropylidene)diphenol (Bisphenol AF, CAS number 1478-61-1), 4,4'-(1-phenylethylidene)bisphenol (CAS number 1571-75-1), 2,2'-dihydroxybiphenyl (CAS number 1806-29-7), 4,4'-(1,4-phenylenediisopropylidene)bisphenol (CAS number 2167-51-3), 1,1-bis(4-hydroxy-3-methylphenyl)cyclohexane (CAS number 2362-14-3), 9,9-bis(4-hydroxyphenyl)fluorene (CAS number 3236-71-3), 4,4'-(1,3-phenylenediisopropylidene)bisphenol (CAS number 13595-25-0), 1,1,1-tris(4-hydroxyphenyl)ethane (CAS number 27955-94-8), 4,4'-(2-ethylhexylidene)diphenol (CAS number 74462-02-5), α,α,α'-tris(4-hydroxyphenyl)-1-ethyl-4-isopropylbenzene (CAS number 110726-28-8), 3,5,4'-trihydroxy-trans-stilbene (resveratrol, CAS number 501-36-0).

10. A writing instrument or a writing substrate comprising the thermochromic ink composition according to claim 1.

11. A process of preparing the thermochromic ink composition according to claim 1, wherein the process comprises the steps of dispersing the core-shell microcapsules in the aqueous dispersion medium and adding the decolorization agent to the aqueous dispersion medium.

12. The thermochromatic ink composition according to claim 1, wherein the decolorization agent has a weight-average molecular weight of less than 1000 g/mol.

13. The thermochromatic ink composition according to claim 2, wherein the decolorization agent has a carbon-to-oxygen ratio of 2.1:1 to 4.5:1.

14. The thermochromatic ink composition according to claim 5, wherein the reaction medium for causing the electron transfer reaction between the components (a) and (b) is selected from ethylene glycol distearate, dimethyl oxalate, methyl behenate, and 1-octadecanol.

\* \* \* \* \*